(12) United States Patent
Ver Steeg et al.

(10) Patent No.: US 7,742,457 B2
(45) Date of Patent: Jun. 22, 2010

(54) SYSTEMS AND METHODS OF CONFIGURING A LAYER-2 SWITCH FOR MULTICAST FILTERING

(75) Inventors: William C. Ver Steeg, Alpharetta, GA (US); William Kevin Kay, Duluth, GA (US)

(73) Assignee: Scientific-Atlanta, LLC, Lawrenceville, GA (US)

(*) Notice: Subject to any disclaimer, the term of this patent is extended or adjusted under 35 U.S.C. 154(b) by 1028 days.

(21) Appl. No.: 11/427,720

(22) Filed: Jun. 29, 2006

(65) Prior Publication Data

US 2008/0002690 A1 Jan. 3, 2008

(51) Int. Cl.
*H04W 4/00* (2009.01)
(52) U.S. Cl. .................. 370/338; 455/453; 455/454
(58) Field of Classification Search ........... 370/338; 455/453, 454
See application file for complete search history.

(56) References Cited

U.S. PATENT DOCUMENTS

| 7,567,565 | B2* | 7/2009 | La Joie ................. 370/390 |
|---|---|---|---|
| 2006/0018335 | A1 | 1/2006 | Koch et al. |
| 2006/0098613 | A1* | 5/2006 | Kish et al. ............. 370/338 |
| 2006/0171390 | A1* | 8/2006 | La Joie ................. 370/390 |
| 2007/0201413 | A1* | 8/2007 | Laine et al. ............ 370/338 |
| 2007/0204300 | A1* | 8/2007 | Markley et al. ......... 725/46 |
| 2007/0204311 | A1* | 8/2007 | Hasek et al. ........... 725/91 |
| 2007/0204314 | A1* | 8/2007 | Hasek et al. ........... 725/100 |
| 2008/0201748 | A1* | 8/2008 | Hasek et al. ........... 725/98 |
| 2009/0007199 | A1* | 1/2009 | La Joie ................. 725/95 |

FOREIGN PATENT DOCUMENTS

| EP | 0967753 | 12/1999 |
|---|---|---|
| EP | 1720283 | 11/2006 |

OTHER PUBLICATIONS

Wan-Ki Park et al. "An Implementation of FTTH Based Home Gateway Supporting Various Services," Consumer Electronics, IEEE Transactions on, vol. 52, No. 1, Feb. 2006, pp. 110-115, XP002474669.

(Continued)

*Primary Examiner*—Joseph H Feild
*Assistant Examiner*—Huy D Nguyen
(74) *Attorney, Agent, or Firm*—Merchant & Gould

(57) ABSTRACT

Systems and methods for reducing multicast IP packet bandwidth in a local area network carrying Internet protocol television (IPTV) traffic are disclosed. One embodiment of a system comprises: a layer-2 switch; a slave digital home communication terminal (DHCT); and a master DHCT. The layer-2 switch has a control channel and a plurality of data ports. The slave DHCT is coupled to a first data port of the plurality. The master DHCT is coupled to the layer-2 switch control channel. The master DHCT comprises logic for requesting the layer-2 switch, over the control channel, operate in a first configuration. In the first configuration, the layer-2 switch associates a layer-2 multicast address with the first data port, examines layer-2 multicast packets, and forwards the examined layer-2 multicast packets on the first data port only if the layer-2 destination address is the first layer-2 multicast address.

12 Claims, 8 Drawing Sheets

OTHER PUBLICATIONS

Wan-Ki Park et al. "IPTV-Aware Multi-Service Home Gateway Based on FTTH Access Network," Consumer Electronics, 2005. (ISCE 2005). Proceedings of the Ninth International Syposium on, Jun. 14, 2005, pp. 285-290, XP010832161.

Wan-Ki Park et al. "An Implementation of FTTH Based Home Gateway Supporting Various Services," Consumer Electronics, 2006. ISCE '06, 2006 Digest of Technical Paters, Las Vegas, NV, Jan. 7-11, 2006, Jan. 7, 2006, pp. 63-64, XP010896505.

Wan-Ki Park et al. "An Implementation of the Broadband Home Gateway Supporting Multi-Channel IPTV Service," Consumer Electronics, 2006. ISCE '06. 2006 IEEE Tenth International Symposium on, Jan. 7, 2006, pp. 1-5, XP002474670.

Christensen M. et al. "Considerations for Internet Group Management Protocol (IGMP) and Multicast Listener Discovery (MLD) Snooping Switches," Internet Engineering Task Force, May 2006, XP015046326 RFC 4541.

* cited by examiner

SYSTEMS AND METHODS OF CONFIGURING A LAYER-2 SWITCH FOR MULTICAST FILTERING

CROSS REFERENCE TO RELATED APPLICATIONS

Not applicable.

FIELD OF THE DISCLOSURE

The present disclosure relates to switches in a data network, and more specifically, to systems and methods for configuring switches in a data network.

BACKGROUND

A growing number of consumers now have high-speed, or broadband, connections to the Internet in their homes. The increased bandwidth provided by these broadband connections allows the delivery of digital television and/or video services to home consumers. One such technology for delivering digital television or video services uses the Internet Protocol (IP) as a transport mechanism. This technology is referred to as IP television, or IPTV.

IPTV makes use of a feature called "IP multicast" when delivering the same stream of television or video programming to a group of subscribers. The IP packets in the stream have the same IP destination address, which is a special type of address called a multicast address. All devices in the IP multicast group receive packets sent to that multicast address.

This use of multicast is much more efficient than sending unicast packets (addressed to each individual device in the group). However, the use of multicast addressing can lead to network performance problems in the home when a local area network (LAN) is used to deliver programming to multiple set-top boxes. Under some conditions, the result is that the viewer sees errors or artifacts in the video frames, or the stream freezes, or even that the set-top becomes unresponsive. Thus, a need arises for these and other problems to be addressed.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

The embodiments disclosed herein provide systems and methods for configuring a layer-2 switch for multicast filtering in an IPTV environment. One such embodiment includes two set-tops, each coupled to a layer-2 switch and receiving IP multicast traffic through the switch. One set-top, the master, is coupled to a control channel on the switch; the other set-top, the slave, is not. The master set-top requests, on behalf of the slave set-top, the switch to operate in a multicast configuration in which IP multicast traffic destined for the slave set-top is forwarded only on the switch port to which the slave is coupled, rather than being forwarded on all switch ports.

With this switch configuration, the only multicast traffic received by the slave set-top is traffic specifically directed to the slave's multicast address. Without this configuration, multicast packets not directed to the slave's own address would be received and then discarded. This is a waste of set-top processing resources and can interfere with the process of decoding the video stream that is presented to the user.

Figure 1:
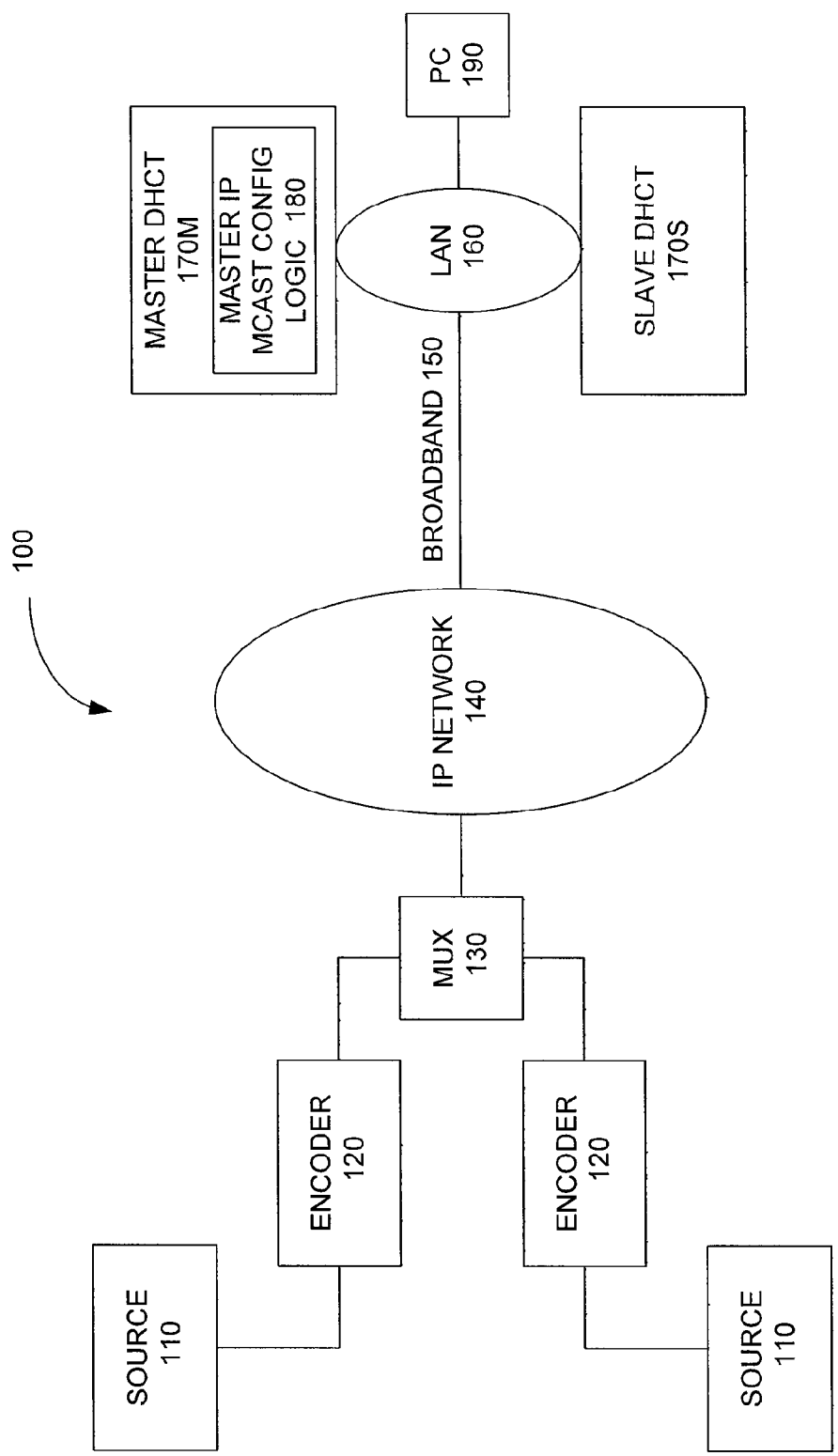
FIG. 1 is a block diagram of an environment for one embodiment of a system and method for configuring a layer-2 switch for multicast filtering.

FIG. 1 is a block diagram of an environment in which one embodiment of a system and method for configuring a layer-2 switch for multicast filtering is located. System 100 delivers digital television and/or video services to subscribers using the Internet Protocol (IP). System 100 comprises: one or more broadcast sources 110; one or more broadcast encoders 120; a broadcast multiplexer 130; an IP network 140; a broadband connection 150; a customer local area network (LAN) 160; and multiple digital home communication terminals (DHCT) 170.

Broadcast sources 110, such as cable networks or on-air television stations, provide television or video programming. Broadcast encoders 120 take as input an analog signal digital stream from broadcast source 110, and output a stream that is compressed and formatted. Broadcast multiplexer 130 multiplexes encoded broadcast streams into a single stream.

The stream is transmitted through IP network 140, then over broadband connection 150 to customer LAN 160. The stream is then received by DHCTs 170, which convert the stream of IP packets into a standard analog or digital video signal. One of the DHCTs 170 is a master DHCT 170M and includes master IP multicast configuration logic 180, which implements one of the systems and methods of configuring a layer-2 switch for multicast filtering disclosed herein. The other DHCTs 170B are slaves, relying on the master DHCT 170M to configure the switch within LAN 160.

In some embodiments, a DHCT 170 also provides interactive features, such as an electronic program guide (EPG), Web browser, and DVR (digital video recorder) functionality. In some embodiments, DHCT 170 takes the form of a set-top box. In others, DHCT 170 is implemented by a personal computer (PC).

DHCT 170 supplies the video signal to a display (not shown) for viewing by the customer. In one embodiment, the display is a television. In another embodiment, the display is a computer monitor. In some embodiments, LAN 160 also includes other devices, such as a PC 190.

Figure 2:
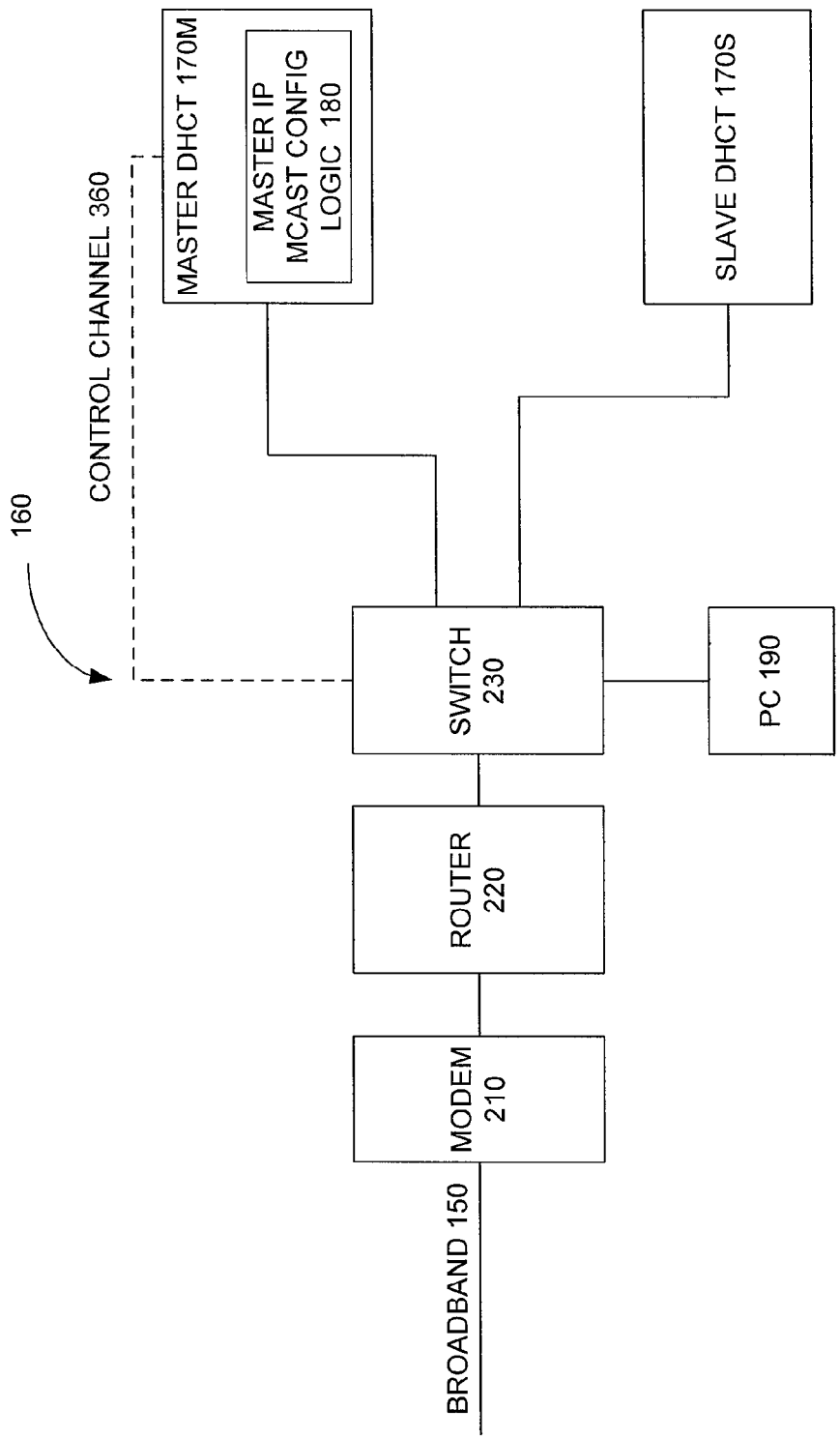
FIG. 2 is a block diagram showing further details of LAN 160 from FIG. 1.

FIG. 2 is a block diagram showing further details of LAN 160 from FIG. 1. Master DHCT 170M and slave DHCT 170S reside in LAN 160. Each is coupled to a data port on switch 230. Master DHCT 170M is, in addition, electrically coupled to switch 230 through control channel 360, which will be discussed further below in connection with FIG. 3. Slave DHCT 170S is not coupled to switch 230 through control channel 360.

LAN 160 is in communication with IP network 140 (FIG. 1) through broadband connection 150. More specifically, packets traveling over broadband connection 150, including video IP packets, are received by a modem 210. These packets use a physical layer (layer-1) format which is specific to broadband connection 150. Examples of broadband connection 150 include digital subscriber line (DSL) and hybrid fiber coaxial (HFC) cable. Modem 210 converts the physical layer of these packets to use a different physical layer, that of LAN 160.

The packets are then passed to a layer-3 forwarding device 220, which examines the network, or Layer-3, header of the received packets. Layer-3 forwarding device 220 uses the network destination address in the network header to decide which packets should be forwarded to devices on LAN 160. Layer-3 forwarding device 220 is also known as a router or Layer-3 switch. In some embodiments, router 220 is combined with modem 210 in a device commonly known as a DSL router.

Router 220 is coupled to Layer-2 forwarding device 230, also called a Layer-2 switch or a bridge. Packets destined for DHCT 170M and DHCT 170S exit router 220 and enter switch 230, which examines the media access control (MAC), or Layer-2, header of the packets. Switch 230 uses the MAC destination address in the MAC header to decide which port the packet will be forwarded on. (One of ordinary skill in the art should understand how a Layer-2 forwarding device learns which MAC addresses are associated with which ports, by examining MAC source addresses as packets enter the device.) Because each DHCT 170 is coupled to one switch port, this fowarding decision also determines which device(s) on LAN 160 receive the forwarded packet. Switch 230 is a Layer-2 device, and does not make forwarding decisions based on information contained in higher layers such as the network layer.

In the embodiments discussed herein, Ethernet is used as Layer-2 and IP is used as Layer-3. However, one of ordinary skill in the art should understand that the same principles can be applied to other Layer-2 and Layer-3 implementations. In one embodiment, master DHCT 170M, slave DHCT 170S, and switch 230 are combined into a single device.

Figure 3:
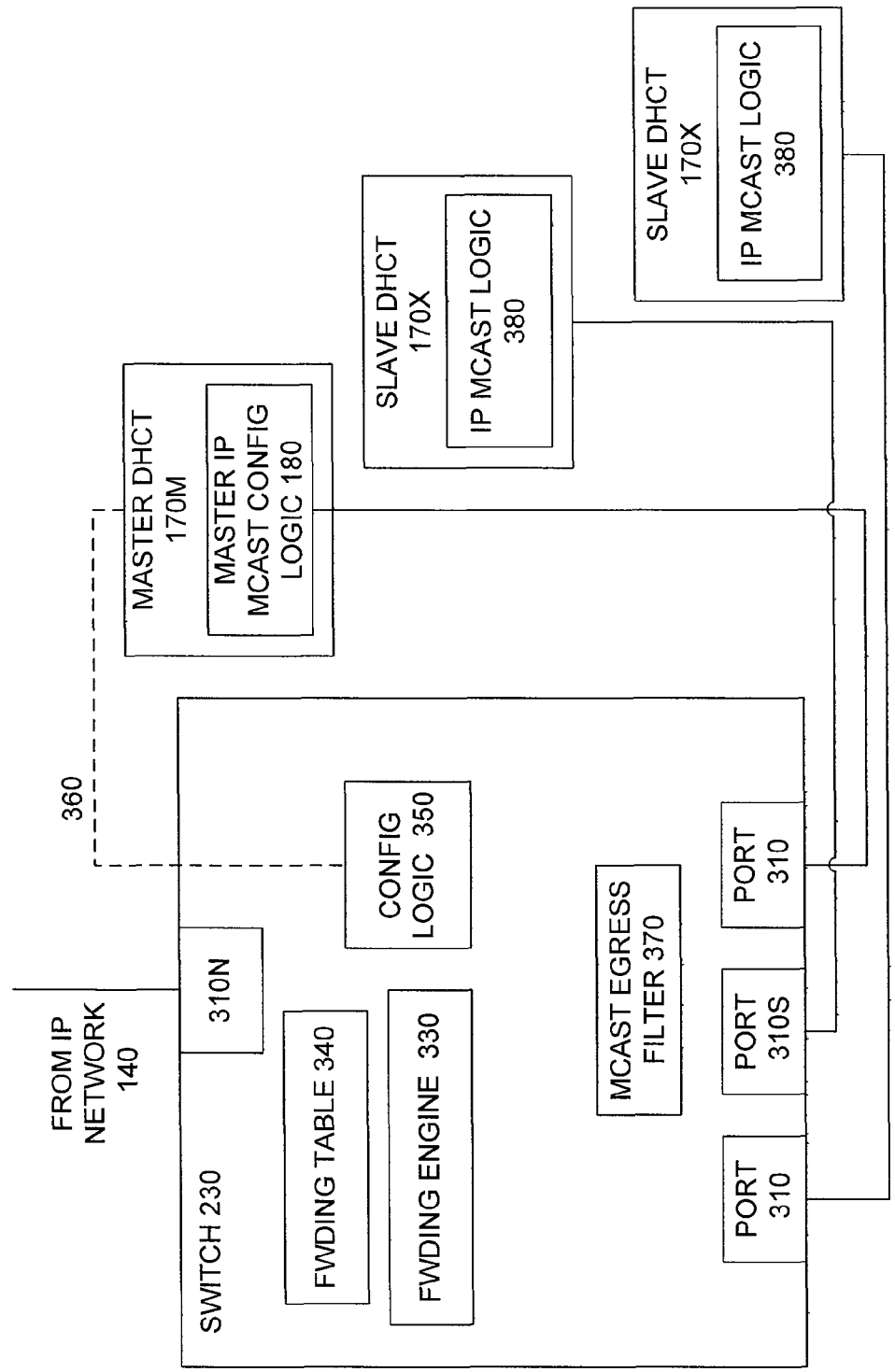
FIG. 3 is a block diagram showing further details of the switch 230 and master DHCT 170M from FIG. 2.

FIG. 3 is a block diagram showing further details of the switch 230 and master DHCT 170M. Packets enter and exit switch 230 through at least two data ports 310 coupled to a physical medium 320. A forwarding engine 330 examines the Ethernet destination address in the Ethernet header of a received packet to decide which port 310 the packet will exit (called the egress port). More specifically, forwarding engine 330 looks up the Ethernet destination address in a forwarding table 340, which returns the identifier of the egress port 310. In some embodiments, forwarding engine 330 is implemented by a switching fabric and a network controller, and forwarding table 340 is implemented by a content addressable memory (CAM).

Configuration logic 350 allows some behaviors of switch 230 to be configured by another device, through a control channel 360. In some embodiments, configuration logic 350 is implemented by a set of registers. Control channel 360 may be implemented, for example, by a local bus (e.g., inter-integrated circuit (I2C) bus, peripheral component interconnect (PCI) bus).

Master DHCT 170M is coupled to control channel 360, but slave DUCT 170S is not, such that master DHCT 170M is capable of configuring switch 230 but slave DHCT 170S is not. Slave DHCT 170S instead relies on master DHCT 170M to act as a switch configuration proxy, sending to master DHCT 170M configuration parameters including a multicast address that the slave DHCT 170S wishes to receive packets for, and an identifier of the port (310S) to which slave DHCT 170S is coupled.

In response, master IP multicast configuration logic 180 in master DHCT 170M transmits a request over the control channel 360 for switch 230 to configure a multicast egress filter 370 on behalf of slave DHCT 170S. More specifically, master DHCT 170M instructs configuration logic 350 in switch 230 to set up multicast egress filter 370 so that those packets having a multicast address matching the configuration parameter are forwarded only on the port that is specified by the configuration parameter. (Multicast egress filtering will be discussed in further detail in connection with FIG. 4.)

Note that multicast egress filtering on behalf of slave DHCT 170S prevents multicast packets destined for slave DHCT 170S from being forwarded on other ports (here, port 310X). Thus, multicast egress filtering on behalf of slave DHCT 170S benefits other DHCTs (here, master DHCT 170M and another slave DHCT 170X). Without this configuration mode, switch 230 forwards multicast packets directed to slave DHCT 170S on all ports 310, forcing master DHCT 170M and DHCT 170X to receive and then discard those multicast packets which are not directed to them. This discard procedure is an inefficient use of device and network resources.

In the embodiment of FIG. 3, master IP multicast configuration logic 180 determines the configuration parameters for the multicast filter (i.e., the identifier of the data port to which slave DHCT 170S is coupled, and the slave multicast address) by communicating with IP multicast logic 380 in slave DHCT 170S. This information is exchanged over a management channel 390 between master DHCT 170M and slave DHCT 170S which can be implemented, for example, by exchanging Ethernet packets that conform to some sort of multicast management protocol. Another method of determining slave port number and address will be discussed in connection with FIG. 7.

Figure 4:
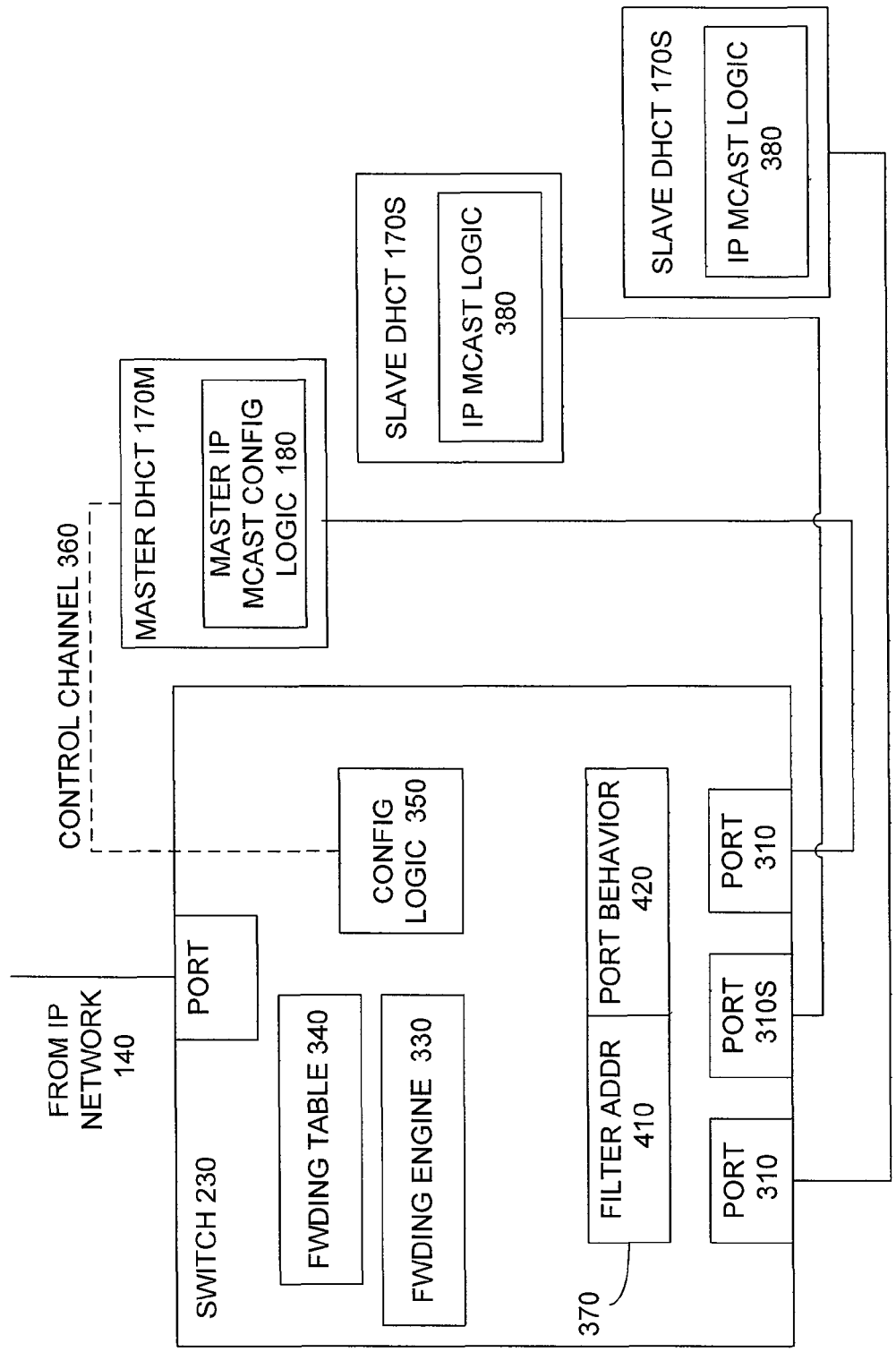
FIG. 4 shows further details of multicast egress filter 370 from FIG. 3.

FIG. 4 shows further details of multicast egress filter 370. Multicast egress filter 370 is associated with a multicast address (410), and with a Pass/Block behavior (420) for each port 310. When a multicast egress filter 370 is enabled, incoming multicast packets are compared against the associated address 410 before egress, and when a multicast packet matches the address 410, the packet is forwarded on the port 310 only if the port behavior is Pass. When multicast egress filter 370 is not enabled, multicast packets are forwarded on all ports 310. In some embodiments, switch 230 has more than one multicast egress filter 370.

In the example embodiment of FIG. 4, filter address 410 is a key value for the forwarding table 340, and the resulting lookup data (also known as a resultant) is a port bitmask specifying Pass/Block behavior 420. For example, a resultant of 01101 specifies that ports 0, 2 and 3 are Pass and ports 1 and 4 are Block. One of ordinary skill in the art should understand that other implementations of multicast egress filter 370 are possible, and all such are contemplated here.

Multicast egress filter 370 is a perfect filter, meaning that only packets with exact address matches will be passed. In embodiments where the filter address is stored in forwarding table 340, this means that the number of bits in the table entry is at least as large as the number of bits in a multicast address. For Ethernet multicast, this is 48 bits.

Perfect filtering in switch 230 is especially important when the MAC layer of the DHCT contains an imperfect multicast filter for received packets. An imperfect filter matches only on a subset of the destination multicast address, and passes any packets in the matching subset on to the driver software. The driver software then tests the destination address of each of these possible matches against a full MAC address, and passes up to the IP stack any packets that match the full address. Those packets that do not match the full address are discarded. Although the application layer software (for example, a video decoder) is not aware of these improperly received packets, valuable processing resources are utilized discarding the packets.

Figure 5:
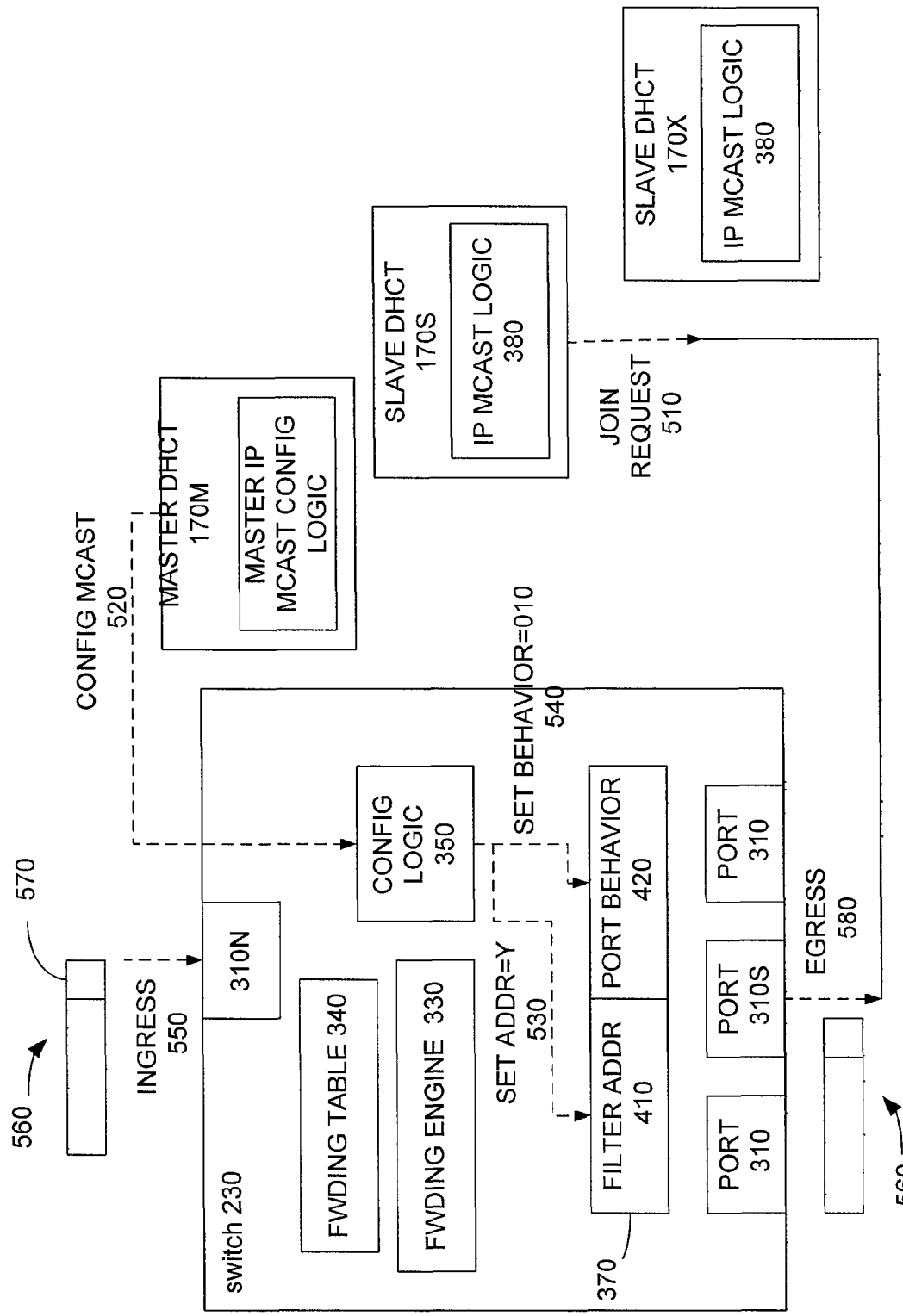
FIG. 5 is a data flow diagram illustrating the flow of IP multicast packets through switch 230, using one embodiment of a system and method of configuring a layer-2 switch for multicast filtering.

FIG. 5 is a data flow diagram illustrating the flow of IP multicast packets through switch 230, using one of the systems and methods of configuring a layer-2 switch for multicast filtering described herein. Slave DHCT 170S sends a request 510 to local router 220 to join the IP multicast group, specified by a IP multicast address. Master DHCT 170M maps IP multicast address to an Ethernet multicast address, in this example address Y. (The Internet standard for IP Multicast, RFC 1121, describes the procedure for mapping from an IP multicast address to an Ethernet multicast address.)

Master DHCT 170M configures (520) switch 230 with a multicast egress filter for slave port 310S using the mapped Ethernet multicast address Y. Switch 230 responds to the configuration request by storing (530) Ethernet multicast address Y as the egress filter address 410, and setting (540) the port behavior 420 for slave port 310S to Pass, and the port behavior for all other ports to Block.

In this example embodiment, switch configuration logic 350 set the identified port's behavior to Pass, and the others to Block. In another implementation, the filter configuration data allows the requester to specify multiple port identifiers, and behaviors for each. In yet another implementation, the port associated with the multicast egress filter 370 filter is identified by a unicast Ethernet address rather than a port identifier, and switch 230 determines which port is associated with that unicast MAC address. (One of ordinary skill in the art should understand how the switch learns which unicast MAC addresses are associated with which ports.)

In alternative embodiment, the default behaviour is that all multicast traffic on all ports is set to block, then enable multicast egress is enabled on a per transaction basis. Note that more than one egress port may be configured to pass a given multicast address.

At some point after this egress filter configuration is applied, switch 230 receives (550) IP multicast packet 560 through network-side port 310N. Forwarding engine 330 extracts the Ethernet destination address 570 from packet 560, and uses forwarding table 340 to determine the egress port for packet 560. In this example scenario, the egress port is 310S, since the Ethernet destination address 570 corresponds to slave DHCT 170S.

When operating in a mode in which an egress filter is enabled, forwarding engine 330 takes the following actions before forwarding packet 560 out an egress port 310. Forwarding engine 330 determines that Ethernet destination address 570 is a multicast address. In response to this determination, forwarding engine 330 checks multicast egress filter 370, and further determines that Ethernet destination address 570 matches egress filter address 410. Forwarding engine 330 then examines the behavior setting for the port associated with multicast egress filter 370. In this example scenario, the associated port is port 310S and the port behavior specifies Pass, so forwarding engine 330 transmits 580 packet 560 on port 310S.

Figure 6:
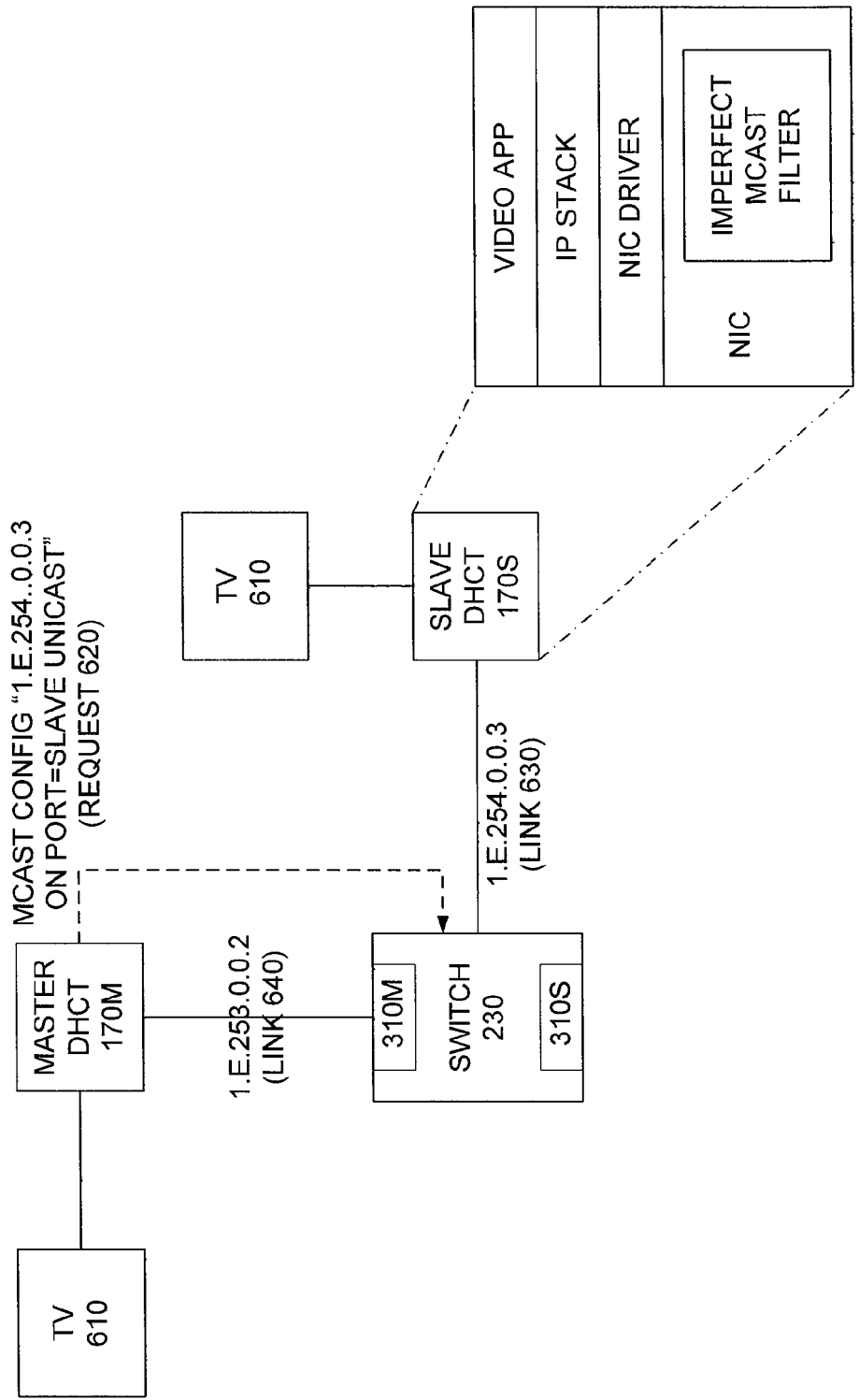
FIG. 6 is a data flow diagram illustrating the flow of IP multicast packets through LAN 160, using one embodiment of a system and method of configuring a layer-2 switch for multicast filtering.

FIG. 6 is a data flow diagram illustrating the flow of IP multicast packets through LAN 160, using one of the systems and methods of configuring a layer-2 switch for multicast filtering described herein. In this example, the devices on LAN 160 include master DHCT 170M and slave DHCT 170S, each of which receives a stream of IPTV multicast packets and displays the decoded video stream on a TV 610.

To reduce the bandwidth of packets received by each DHCT, master DHCT 170M configures (620) the multicast egress filter 370 on switch 230 to forward multicast packets requested by a slave DHCT 170S—here, those directed to multicast address 1.E.244.0.0.3.—to the port (310S) associated with that slave's unicast address, and to forward multicast packets requested by the master DHCT 170M on the port (310M) associated with the master DHCT 170M unicast address. As a result, multicast traffic on the link (630) to slave DHCT 170S includes those multicast packets that are sent to the multicast address specified by the slave (1.E.244.0.0.3) but not the master's multicast address (1.E.0.0.0.2). Similarly, multicast traffic on the link (640) to master DHCT 170M includes the master's multicast address (1.E.253.0.0.2) but not the slave's multicast address (1.E.253.0.0.3).

When slave DHCT 170S receives packets on its registered multicast address (1.E.244.0.0.3), the packets are processed as follows. The network interface (NIC) 590 receives the packet off the physical medium and notifies NIC driver 5100 that an incoming packet has arrived. NIC driver 5100 passes the received multicast packet on to IP stack 5110. The packet is then passed on to video application 5120, which decodes the packet stream to produce a video signal, which is supplied to TV 610.

In some embodiments, NIC 590 also includes an imperfect multicast filter (not shown), which can be enabled as an ingress filter on received multicast packets. The imperfect multicast filter can be implemented, for example, by a combination of a CAM and a hash table. The imperfect filter has less than the full number of address bits, so that more than one multicast address will match the filter.

Figure 7:
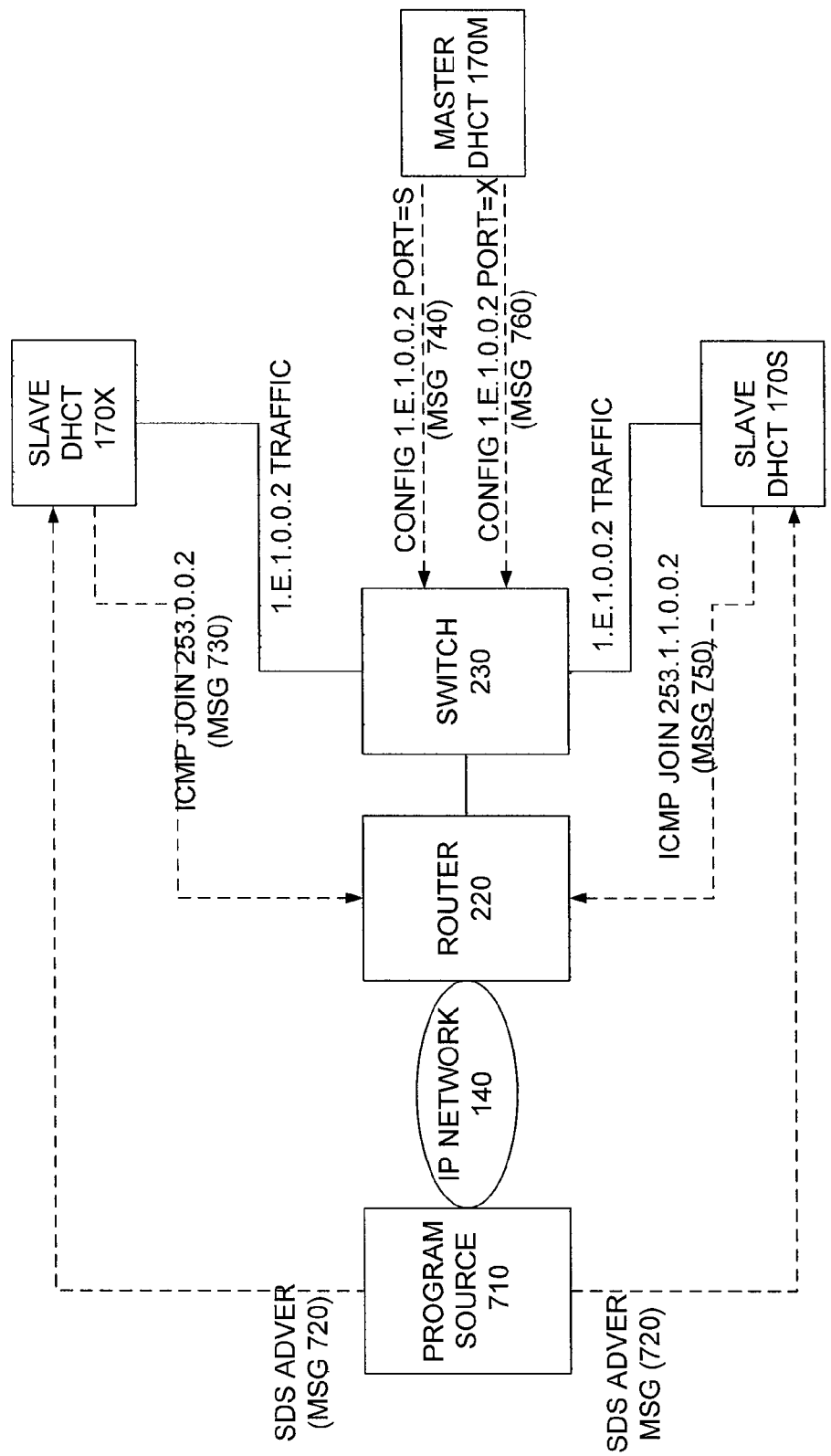
FIG. 7 illustrates another embodiment of a system and method for configuring a layer-2 switch for multicast filtering.

FIG. 7 illustrates another embodiment of a system and method for configuring a layer-2 switch for multicast filtering, in which master IP multicast configuration logic 180 obtains multicast address and port information from slave DHCT 170S in an indirect manner. An IPTV program source 710 advertises to DHCTs 170 the availability of an IPTV program stream, using a service discovery and subscription (SD&S) protocol. Here, the advertisement 720 is shown traveling on logical channels to master DHCT 170M and slave DHCT 170S, respectively. In one embodiment, each advertisement 720 includes a list of services (e.g., FOX, ABC, ESPN) and IP multicast addresses on which each service can be received. In addition, the advertisements themselves are typically delivered on a well-known IP multicast address which is monitored by DHCTs 170. The details of the advertisement process should be understood by one of ordinary skill in the art, and will not be discussed in further detail.

After receiving advertisement 720, a slave DHCT 170S elects to receive the program stream associated with one of the advertised services by responding sending an Internet Group Multicast Protocol (IGMP) Report packet 730 to the IP multicast address of the service (contained in advertisement 720). The IGMP Report is also known as an IGMP Join Request. Source 710 delivers the stream of IPTV packets to the service multicast address, which are then received by slave DHCT 170S.

Master DHCT 170M uses the following process to program switch 230 so that the stream of IPTV packets is forwarded only on port 310S. Master DHCT 170M listens on the well-known SD&S multicast address, so that all advertisements are received. Master DHCT 170M extracts the IP multicast addresses for these services, and listens for packets on each of these service addresses. In one embodiment, listening on an IP multicast address involves registering the service address with the IP stack and/or NIC driver. In this manner, master DHCT 170M receives both the advertisement 720 and the IGMP Join 730.

From IGMP Join 730, master DHCT 170M extracts the IP multicast address (here, 253.0.0.2) on which slave DHCT 170S receives the IPTV packet stream. Master DHCT 170M maps the extracted IP multicast address to a corresponding Layer-2 multicast address (1.E.253.0.0.2). A person of ordinary skill in the art should understand that both extracted IP multicast address and the mapped Layer-2 address represent addresses on which slave DHCT 170S receives IPTV traffic.

Master DHCT 170M then uses the Layer-2 multicast address associated with the slave DHCT 170S through the IGMP Join 730, and an identifier of the port to which slave DHCT 170S is attached, to build a switch configuration request. In one embodiment, master DHCT 170M sets the port identifier configuration parameter is set to the Layer-2 unicast address from which the IGMP Join 730 was sent. (A person of ordinary skill in the art should understand how switch 230 maps the Ethernet unicast address of an attached device to the port through which the device is attached.) In another embodiment, master DHCT 170M sets the port identifier configuration parameter to the Layer-2 unicast address assigned to slave DHCT 170S, which slave DHCT 170S provides to master DHCT 170M by through management channel 390. In yet another embodiment, master DHCT 170M sets the port identifier configuration parameter to a port identifier which slave DHCT 170S provides to master DHCT 170M by through management channel 390.

The switch configuration request is sent (740) to switch 230. As explained earlier in connection with FIGS. 3-5, switch 230 responds to the configuration request by setting up multicast egress filter 370 so that the behavior of port 310S is to pass, or allow egress of, packets directed to the requested multicast address, and the behavior of the other port 310X is to block egress of these same packets. The result is that switch 230 forwards IPTV packet stream only on port 310S, that is, only to slave DHCT 170S.

In this example scenario, another slave DHCT 170X sends an IGMP Join 750 to the same multicast address (here, 253.0.0.1). Master DHCT 170M sends another switch configuration request 760 containing this same IP multicast address and the Ethernet unicast address of slave DHCT 170X. As explained earlier, switch 230 responds to a second configuration request for the same multicast address by setting the behavior for the additional port 310X to Pass instead of Block. Thus, multicast traffic to this address (here, 253.0.0.1) is forwarded on multiple ports.

In some embodiments, slave DHCT 170S stops receiving an IPTV stream by sending an IGMP Leave request to the registered multicast address. In such embodiments, master DHCT 170M, which also receives the IGMP Leave, responds by configuring switch 230 to set the behavior of 310S to Block rather than Pass. When switch 230 detects that the final port having a Pass behavior is being changed to Block (signifying that no more ports are interested in that multicast address), switch 230 disables multicast egress filter 370 and returns to default behavior, which is to block that multicast address on all ports.

Figure 8:
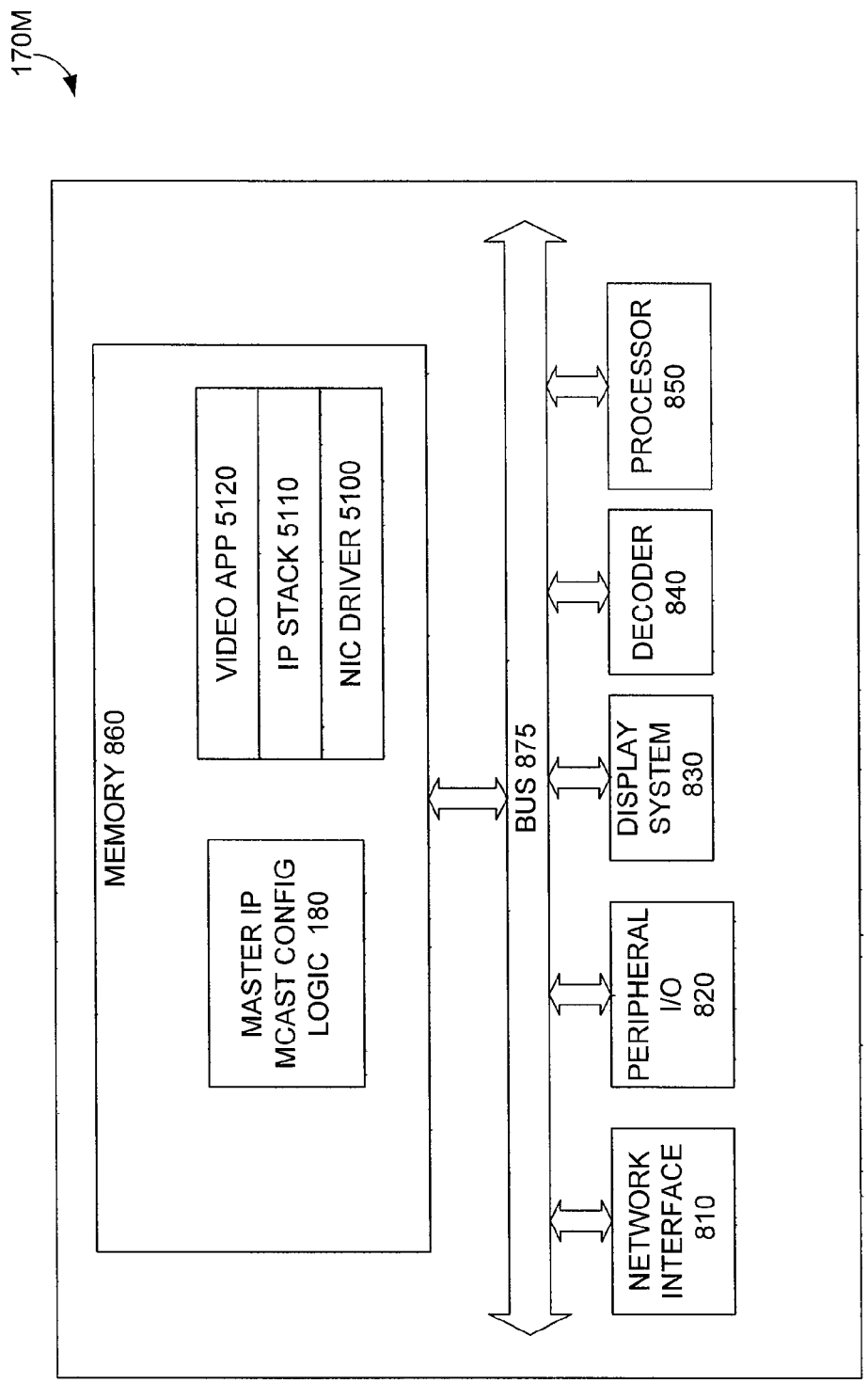
FIG. 8 is a block diagram showing selected components of master DHCT 170M from FIG. 1.

FIG. 8 is a block diagram showing selected components of master DHCT 170M. Master DHCT 170M comprises: a network interface 810; an peripheral I/O interface 820; an display system 830; a decoder 840; a processor 850; and memory 860. These components are coupled by a bus 875. Peripheral I/O interface 820 provides input and output signals, for example, user inputs from a remote control or front panel buttons or a keyboard, and outputs such as LEDs or LCD on the front panel. Network interface 810 receives a stream of IPTV packets. Decoder 840 decodes the video packets encapsulated within the IPTV packets into a stream of decoded frames. Display system 830 converts the frames into a video signal for display by a computer monitor or a television.

Memory 860 contains instructions that are executed by processor 850 to control operations of DHCT 170. Residing in memory 860 are master IP multicast configuration logic 180, NIC driver 5100, IP stack 5110 and video application 5120. Omitted from FIG. 8 are a number of conventional components, known to those skilled in the art, that are unnecessary to explain the operation of the systems and methods of configuring a layer-2 switch for multicast filtering disclosed herein.

Any process descriptions or blocks in flowcharts should be understood as representing modules, segments, or portions of code which include one or more executable instructions for implementing specific logical functions or steps in the process. As would be understood by those of ordinary skill in the art of the software development, alternate implementations are also included within the scope of the disclosure. In these alternate implementations, functions may be executed out of order from that shown or discussed, including substantially concurrently or in reverse order, depending on the functionality involved.

The systems and methods disclosed herein can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) an optical fiber and a portable compact disk read-only memory (CD-ROM).

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

We claim:

1. A digital home communication terminal (DHCT) for reducing multicast IP packet bandwidth in a local area network carrying Internet protocol television (IPTV) traffic, the DHCT comprising:
   logic for determining an IP multicast address and a port identifier, each associated with a slave DHCT;
   logic for transmitting a layer-2 multicast address derived from the IP multicast address and the port identifier to the switch as a request for the switch to operate in a first multicast configuration,
   the layer-2 switch operating in the first multicast configuration to associate the first layer-2 multicast address with the data port, examine layer-2 packets having a layer-2 multicast destination address, and forward the examined layer-2 multicast packets on the data port, wherein the forwarding occurs only if the layer-2 destination address is the first layer-2 multicast address.

2. The DHCT of claim 1, wherein the DHCT further comprises:
   logic to receive a configuration request from the slave DHCT, the configuration request including an IP multicast address and a port identifier; and
   logic to map the IP multicast address to the layer-2 multicast address,
   wherein the logic for requesting further comprises logic to transmit the layer-2 multicast address and the identified port to the switch as a request to operate in the first configuration.

3. The DHCT of claim 1, wherein the DHCT further comprises:
   logic to receive an IGMP join request for an IP multicast address;
   logic to map the IP multicast address to the layer-2 multicast address; and
   logic to identify which of the plurality of data ports the IGMP join request was transmitted from,
   wherein the logic for requesting further comprises logic to transmit the layer-2 multicast address and the identified port to the switch as a request to operate in the first configuration.

4. The DHCT of claim 1, wherein the DHCT further comprises:
   logic to receive an IGMP leave request for the IP multicast address;
   wherein the logic for requesting further comprises logic to transmit the layer-2 multicast address and the identified port to the switch as a request to operate in a second configuration,
   wherein while in the second configuration the layer-2 switch forwards layer-2 multicast packets onto the first data port even if the layer-2 destination address of the received packets is not the first layer-2 multicast address.

5. The DHCT of claim 1, wherein the DHCT further comprises:
   logic to receive packets addressed to a first IP multicast address associated with advertisement of IPTV services;
   logic to extract a second IP multicast address from one of the packets; and
   logic to receive the IGMP join request on the second IP multicast address.

6. The DHCT of claim 1, wherein the DHCT further comprises:
   logic for requesting the layer-2 switch, over the control channel, to operate in a second configuration wherein the layer-2 switch forwards layer-2 multicast packets onto the first data port even if the layer-2 destination address is not the first layer-2 multicast address.

7. The DHCT of claim 1, wherein the switch comprises:
   a forwarding engine;
   a multicast egress filter associated with a filter multicast address and a block behavior, the block behavior associated with an egress port; and
   configuration logic configured to associate a specified layer-2 multicast address, received via the control channel, with the multicast egress filter and to associate a specified port and behavior, received via the control channel, with the multicast egress filter,
   wherein the forwarding engine compares a received multicast packet against the filter multicast address and forwards the multicast packet on the egress port only if the port behavior specifies blocking.

8. A method, performed in a digital home communication terminal (DHCT), for reducing multicast IP packet bandwidth in a local area network carrying Internet protocol television (IPTV) traffic, the method comprising:
   determining an IP multicast address and a port identifier, each associated with a slave DHCT;
   mapping the IP multicast address to a layer-2 multicast address; and
   requesting the layer-2 switch, over the control channel, to operate in a first multicast configuration,
   the layer-2 switch operating in the first multicast configuration to associate the first layer-2 multicast address with the identified port, examine layer-2 packets having a layer-2 multicast destination address, and forward the examined layer-2 multicast packets on the identified port, wherein the forwarding occurs only if the layer-2 destination address matches the first layer-2 multicast address.

9. The method of claim 8, wherein the port identifier comprises an Ethernet unicast address assigned to the slave DHCT or a port number identifying a data port on the switch to which the slave DHCT is coupled.

10. The method of claim 8, wherein the determining step further comprises:
    receiving a configuration request from the slave DHCT, the configuration request including the IP multicast address and the port identifier.

11. The method of claim 8, wherein the determining step further comprises:
    receiving an IGMP join request for the IP multicast address; and
    identifying which of the plurality of data ports the IGMP join request was transmitted from,
    wherein the requesting step further comprises transmitting the layer-2 multicast address and the identified port to the switch as a request to operate in the first configuration.

12. The method of claim 8, further comprising:
    receiving an IGMP leave request for the IP multicast address;
    wherein the requesting step further comprises transmitting the layer-2 multicast address and the identified port to the switch as a request to operate in a second configuration,
    wherein while in the second configuration the layer-2 switch forwards layer-2 multicast packets onto the first data port even if the layer-2 destination address of the received packets is not the first layer-2 multicast address.

* * * * *